R. D. TURNER.
Improvement in Apparatus for Ageing Liquors.
No. 129,440.  Patented July 16, 1872.
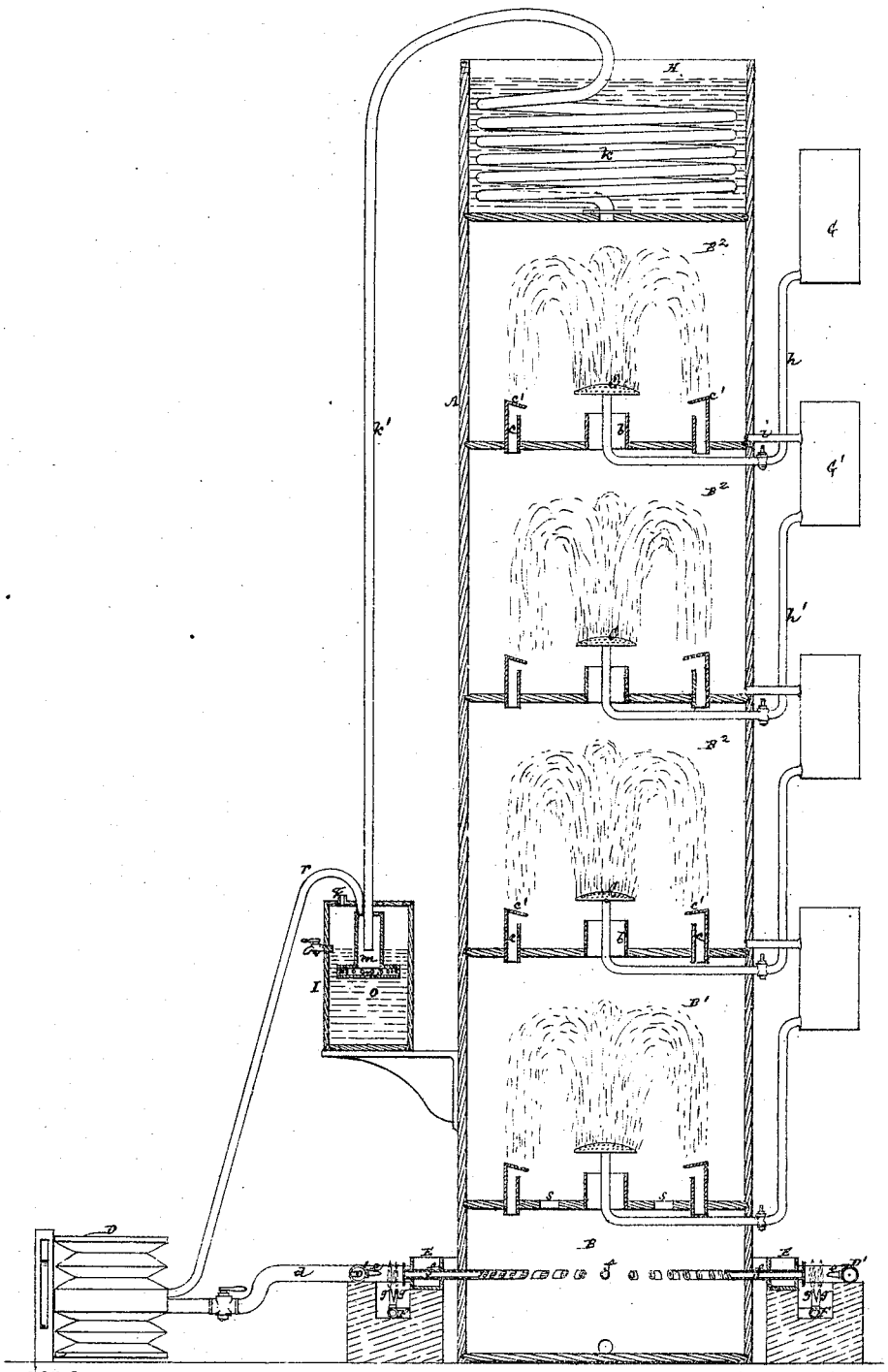

UNITED STATES PATENT OFFICE.

REUBEN D. TURNER, OF NEW YORK, N. Y.

IMPROVEMENT IN APPARATUS FOR AGING LIQUORS.

Specification forming part of Letters Patent No. 129,440, dated July 16, 1872; antedated July 9, 1872.

*To all whom it may concern:*

Be it known that I, REUBEN D. TURNER, of the city, county, and State of New York, have invented a new and useful Improvement in Apparatus for Aging Spirituous Liquors; and I do hereby declare that the following is a full, clear, and exact description of the same, reference being had to the accompanying drawing forming part of this specification, and which represents a sectional elevation of an apparatus constructed in accordance with my invention.

This invention relates to apparatus for aging and improving whisky and other spirituous liquors by exposing the latter in a spray or divided state to the oxidizing action of ozonized air produced by passing a current of atmospheric air through a flame and causing the product to be passed by induction-tubes into the chamber or vessel into which it is required to collect the ozone. The invention consists in a certain combination of a condenser and its worm at top of the vessel in which the liquor is treated with a device for producing an upward draught in said vessel, to prevent back action of the ozonized air and to catch any alcoholic matter passing off from the condenser, and a lower chamber in said vessel into which the ozonized air is distributed for circulation up through the vessel in a contrary direction to the passage of the liquor under treatment.

Referring to the accompanying drawing, A represents an upright tank or vessel, preferably of cylindrical form and divided into a series of chambers, B B¹ B², of any suitable number, arranged one above the other and all in communication with one another by upwardly-projecting necks $b$ $b$ and tubes $c$ $c$ at points around the necks. These necks and tubes serve as ducts for the ozonized air in its upward passage from one chamber to another, and are protected against flow of the liquor down through them by hoods $c'$ $c'$ covering the upper ends of the tubes and rose-distributers C C arranged over the upper ends of the necks. D is a blower by which the air to be ozonized is forced through a pipe, $d$, into an annular distributer, D', from whence it is projected by nozzles $e$ against or through a flame or flames and the product conducted by induction-pipes $f$ into the lower chamber of the tank A. It is preferred to employ duplicate burners $g$ $g$ for the production of the flame through which the air is projected into each induction-pipe, and to make the latter with a contracted aperture at its outer end, so that only ozonized air may enter and yet said pipes be of an enlarged diameter, to present a large extent of cooling-surface within an annular water-trough, E, through which they pass. The burners $g$ $g$ project from an annular gas-pipe, F, disposed to occupy an intermediate position relatively to the air-distributer D' and water-trough E. The spirituous liquor to be treated is first introduced into an upper receiver, G, and from thence conducted by a pipe, $h$, to the top rose C, which scatters the liquid in a spray within the upper chamber B², from whence it passes, by a return-pipe, $i$, to a second receiver, G', to be conveyed by a pipe, $h'$, to the next rose C below, and so on, from chamber to chamber, till it reaches the lower chamber B, by orifices $s$, and from whence it is drawn or run off as required, the same, during its descent through the tank and exposure in the spray-chambers to the ascending column or columns of ozonized air, having been most thoroughly treated. Mounted on the tank A is a condenser, H, having a worm, $k$, which is in open communication at its one end with the upper spray-chamber B² of the tank for the purpose of returning to the tank alcoholic matter that otherwise would pass off. The worm $k$ also has another function. Thus, it is connected at its outer end by a dip-pipe, $k'$, with a device, I, for preventing back action of the ozonized air in the tank by the liquor as it descends therethrough. This device I consists of a tubular stem, $m$, carrying a stationary perforated hollow disk, $n$, arranged so as to be submerged in a water-cylinder or chamber, $o$, that is provided with an air-escape, $q$, and with a blow-pipe, $r$, made to project downward into the hollow stem $m$ and connected at its opposite end with the blower D, so that air blown through the pipe $r$ will be forced out through the perforated disk $n$ and caused to produce a suction or draught on the lower end of the dip-pipe $k'$, thereby giving a gentle upward relief to the ozonized air in the tank and preventing back action as required. The device I also serves, by the submerged position of it in the water of the vessel $o$, to catch any volatile alcoholic matter passing off from the condenser H by its worm $k$ and dip-pipe $k'$, thus preventing waste of alcohol, inasmuch as the water in the vessel $o$ may be used from time to time in rectifying or reducing to its proper standard the spirituous liquor drawn from the lower chamber B of the tank.

What is here claimed, and desired to be secured by Letters Patent, is—

The combination of the condenser H and its worm $k$ with the device I for producing an upward draught in the tank and for collecting alcoholic matter passing off therefrom, the series of spray-chambers $B^1$ $B^2$, and the lower chamber B with its ozonized air-pipes $f$, all constructed and arranged for operation, substantially as specified and for the purpose or purposes herein set forth.

REUBEN D. TURNER.

Witnesses:
FRED. HAYNES,
FERD. TUSCH.